United States Patent
Harrison et al.

(10) Patent No.: US 10,969,957 B2
(45) Date of Patent: *Apr. 6, 2021

(54) USING FINGER TOUCH TYPES TO INTERACT WITH ELECTRONIC DEVICES

(71) Applicant: QEEXO, CO., Mountain View, CA (US)

(72) Inventors: Christopher Harrison, Pittsburgh, PA (US); Julia Schwarz, Pittsburgh, PA (US); Robert Bo Xiao, Pittsburgh, PA (US)

(73) Assignee: QEEXO, CO., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/788,940

(22) Filed: Feb. 12, 2020

(65) Prior Publication Data
US 2020/0183527 A1 Jun. 11, 2020

Related U.S. Application Data

(63) Continuation of application No. 13/887,711, filed on May 6, 2013, now Pat. No. 10,599,250.

(51) Int. Cl.
G06F 3/0488 (2013.01)
G06F 3/041 (2006.01)

(52) U.S. Cl.
CPC ...... *G06F 3/04883* (2013.01); *G06F 3/04186* (2019.05); *G06F 2203/04104* (2013.01); *G06F 2203/04106* (2013.01)

(58) Field of Classification Search
CPC .............. G06F 3/0416; G06F 3/04883; G06F 2203/04104; G06F 2203/04106; G06F 3/04186
See application file for complete search history.

(56) References Cited

U.S. PATENT DOCUMENTS

| | | | |
|---|---|---|---|
| 9,013,452 B2 | 4/2015 | Harrison et al. | |
| 9,019,244 B2 | 4/2015 | Harrison | |
| 10,599,250 B2 | 3/2020 | Harrison et al. | |
| 2005/0083313 A1 | 4/2005 | Hardie-Bick et al. | |
| 2008/0036743 A1 | 2/2008 | Westerman | |
| 2009/0231275 A1 | 9/2009 | Odgers | |
| 2010/0251112 A1 | 9/2010 | Hinckley | |

(Continued)

FOREIGN PATENT DOCUMENTS

| | | |
|---|---|---|
| EP | 2280337 A2 | 2/2011 |
| JP | 2004213312 A | 7/2004 |

(Continued)

OTHER PUBLICATIONS

U.S. Appl. No. 13/887,711, CTAV—Advisory Action (Ptol-303), dated Oct. 8, 2019, 3 pages.

(Continued)

*Primary Examiner* — Abhishek Sarma
(74) *Attorney, Agent, or Firm* — Kwan & Olynick LLP (57) ABSTRACT

An electronic device includes a touch-sensitive surface, for example a touch pad or touch screen. The user interacts with the touch-sensitive surface, producing touch interactions. The resulting actions taken depend at least in part on the touch type. For example, the same touch interactions performed by three different touch types of a finger pad, a finger nail and a knuckle, may result in the execution of different actions.

37 Claims, 6 Drawing Sheets

(56) References Cited

U.S. PATENT DOCUMENTS

| | | | |
|---|---|---|---|
| 2010/0279738 | A1 | 11/2010 | Kim et al. |
| 2011/0018825 | A1 | 1/2011 | Kondo et al. |
| 2011/0057885 | A1 | 3/2011 | Lehtovirta |
| 2012/0019562 | A1 | 1/2012 | Park et al. |
| 2013/0257757 | A1 | 10/2013 | Kim et al. |
| 2013/0316813 | A1 | 11/2013 | Derome et al. |
| 2014/0109004 | A1 | 4/2014 | Sadhvani et al. |
| 2014/0210788 | A1 | 7/2014 | Harrison et al. |
| 2014/0240295 | A1 | 8/2014 | Harrison |
| 2014/0267085 | A1 | 9/2014 | Li et al. |
| 2014/0289659 | A1 | 9/2014 | Harrison et al. |

FOREIGN PATENT DOCUMENTS

| | | |
|---|---|---|
| KR | 20020075283 A | 10/2002 |
| WO | 2006070044 A1 | 7/2006 |
| WO | 2012087308 | 6/2012 |
| WO | 2013059488 A1 | 4/2013 |

OTHER PUBLICATIONS

U.S. Appl. No. 13/887,711, Notice of Allowance and Fees Due (Ptol-85), dated Feb. 3, 2020, 2 pgs.

U.S. Appl. No. 13/887,711, USPTO e-Office Action: Notice of Allowance and Fees Due (Ptol-85), dated Nov. 14, 2019, 7 pgs.

Asano, Futoshi, Goto, Masataka, Itou, Katunobu, Asoh, Hideki; Real-Time Sound Source Localization and Separation System and Its Application to Automatic Speech Recognition; Proceedings of Eurospeech, 2001; p. 1013-1016; 2001.

Benko, Hrvoje, Wilson, Andrew, Balakrishnan, Ravin; Sphere: Multi-Touch Interactions on a Spherical Display; /M.S./ Proceedings of UIST, 2008; pp. 77-86; 2008.

Burges, Christopher; A Tutorial on Support Vector Machines for Pattern Recognition; Data Mining and Knowledge Discovery, 2; pp, 121-167; 1998.

Cao, Xiang, Wilson, Andrew, Balakrishnan, Ravin, Hinckley, Ken, Hudson, Scott; ShapeTouch: Leveraging Contact Shape on Interactive Surfaces; IEEE International Workshop on Horizontal Interactive Human Computer System (TABLETOP); pp. 139-146; 2008.

Deyle, Travis, Palinko, Szabolcs, Poole, Erika Shehan, Starner, Thad; Hambone: A Bio-Acoustic Gesture Interface; Proceedings of ISWC, 2007; pp. 1-8; 2007.

Dietz, Paul, Harsham, Bret, Forlines, Clifton, Leigh, Darren, Yerazunis, William, Shipman, Sam, Schmidt-Nielsen, Bent, Ryall, Kathy; DT Controls: Adding Identity to Physical interfaces; ACM Symposium on User Interface Software & Technology (UIST); pp. 245-252; 2005.

Dietz, Paul, Leigh, Darren; DiamondTouch: A Multi-User Touch Technology; ACM Symposium on User Interface Irv1.S./ Software & Technology {UIST); pp. 219-226; 2001.

Dietz, Paul, Leigh, Darren; DiamondTouch: A Multi-User Touch Technology; ACM Symposium on User Interface Software & Technology {UIST); pp. 219-226; 2001.

Final Office Action—dated Nov. 28, 2014—U.S. Appl. No. 13/849,698, filed Mar. 25, 2013, titled: "Method and System for Activating Different Interactive Functions Using Different Types of Finger Contacts."

Gutwin, Carl, Greenberg, Saul, Blum, Roger, Dyck, Jeff, Tee, Kimberly, McEwan, Gregor; Supporting Informal Collaboration in Shared-Workspace Groupware; Journal of Universal Computer Science, 14(9); pp. 1411-1434; 2008.

Hall, Mark, Frank, Eibe, Holmes, Geoffrey, Pfahringer, Bernhard, Reutemann, Peter, Widen, Ian; The /M.S./ WEKA Data Mining Software: An Update; SIGKDD Explorations, 11(1); pp. 10-18; 2009.

Harrison, Chris, Hudson, Scott; Scratch Input: Creating Large, Inexpensive, Unpowered and Mobile Finger Input /fv1.S./ Surfaces; Proceedings of UIST, 2008; pp. 205-208; 2008.

Harrison, Chris, Tan, Desney, Morris, Dan; Skinput: Appropriating the Body as an Input Surface; Proceedings of CHI, 2010; pp. 453-462; 2010.

Hartmann, Bjorn, Ringel Morris, Meredith, Benko, Hrvoje, Wilson, Andrew; Augmenting Interactive Tables /M.S./ with Mice & Keyboards; Proceedings of UIST, 2009; pp. 149-152; 2009.

Hinckley, Ken, Song, Hyunyoung; Sensor Synaesthesia: Touch in Motion, and Motion in Touch; Proceedings of /M.S.i CHI, 2011; pp. 801-810; 2011.

Hinckley, Ken, Yatani, Koji, Pahud, Michel, Coddington, Nicole, Rodenhouse, Jenny, Wilson, Andy, Benko, Hrvoje, Buxton, Bill; Pen+ Touch=New Tools; Proceedings of UIST, 2010; pp. 27-36; 2010. Hinkley.

Hinkley, Ken, Yatani, Koji, Pahud, Michel, Coddington, Nicole, Rodenhouse, Jenny, Wilson, Andy, Benko, Hrvoje, Buxton, Bill; Manual Deskterity: An Exploration of Simultaneous Pen + Touch Direct Input; Proceedings of CHI, 2010; pp. 2793-2802; 2010.

Holz, Christian, Baudisch, Patrick; The Generalized Perceived Input Point Model and How to Double Touch Accuracy by Extracting Fingerprints; Proceedings of CHI, 2010; pp. 581-590; 2010.

International Search Report and Written Opinion for PCT/US2012/060865; dated Mar. 29, 2013.

International Search Report and Written Opinion received for PCT Application No. PCT/US2012/060865 dated Mar. 29, 2013, 10 pages.

International Search Report and Written Opinion received for PCT Application No. PCT/US2014/049485 dated Nov. 17, 2014, 13 pages.

International Search Report and Written Opinion received for PCT Application No. PCT/US2014/34977 dated Sep. 18, 2014, 12 pages.

Kaltenbrunner, Martin, Bencina, Ross; reacTIVision: A Computer-Vision Framework for Table-Based Tangible Interaction; Proceedings of TEI, 2007; pp. 69-74; 2007.

Matsushita, Nobuyuki, Rekimoto, Jun; HoloWall: Desiging a Finger, Hand, Body, and Object Sensitive Wall; Proceedings of UIST, 1997; pp. 209-210; 1997.

Non-Final Office Action—dated Jun. 24, 2014—U.S. Appl. No. 13/849,698, filed Mar. 23, 2013, titled: "Method and System for Activating Different Interactive Functions Using Different D Types of Finger Contacts."

Non-Final Office Action—dated Oct. 16, 2014—U.S. Appl. No. 13/780,494, filed Feb. 28, 2013, titled: "Input Tools Having Viobro-Acoustically Distinct Regions and Computing Device D for Use With the Same."

Non-Final Office Action—dated Jun. 24, 2014—U.S. Appl. No. 13/849,698, filed Mar. 23, 2013, titled: "Method and System for Activating Different Interactive Functions Using Different Types of Finger Contacts."

Non-Final Office Action—dated Mar. 13, 2015—U.S. Appl. No. 13/958,427, filed Mar. 23, 2013, titled: "Capture of Vibro-Acoustic Data Used to Determine Touch Types".

Non-Final Office Action—dated Oct. 16, 2014—U.S. Appl. No. 13/780,494, filed Feb. 28, 2013, titled: "Input Tools Having Viobro-Acoustically Distinct Regions and Computing Device for Use With the Same."

Olwal, Alex, Wilson, Andrew; SurfaceFusion: Unobtrusive Tracking of Everyday Objects in Tangible User Interfaces; Proceedings of GI, 2008; pp. 235-242; 2008.

Paradiso, Joseph, Hsiao, Kai-yuh, Strickon, Joshua, Lifton, Joshua, Adler, Ari; Sensor Systems for Interactive Surfaces; IBM Systems Journal, 39(3-4); pp. 892-914; 2000.

Paradiso, Joseph, Leo, Che King; Tracking and Characterizing Knocks Atop Large Interactive Displays; Sensor Review, 25(2); pp. 134-143; 2005.

Patten, James, Ishii, Hiroshi, Hines, Jim, Pangaro, Gian; Sensetable: A Wireless Object Tracking Platform for Tangible User Interfaces; Proceedings of CHI, 2001; pp. 253-260; 2001.

Rekimoto, Jun, Saitoh, Masanori; Augmented Surfaces: A Spatially Continuous Work Space for Hybrid Computing Environments; Proceedings of CHI, 1999; pp. 378-385; 1999.

Rekirnoto, Jun, Sciammarella, Eduardo; ToolStone: Effective use of the Physical Manipulation Vocabularies of Input Devices; Proceedings of UIST, 2000; pp. 109-117; 2000.

(56) References Cited

OTHER PUBLICATIONS

Rekimoto, Jun; SmartSkin: An Infrastructure for Freehand Manipulation on Interactive Surfaces; Proceedings of CHI, 2002; pp. 113-120; 2002.

Singh, et al. "Personalizing Smartwatch Based Activity Recognition Using Transfer Learning," hllps://arxiv.org/bs/1909.01202v1, Sep. 3, 2019,6 pages.

Stevan Vigneaux, Director of Product Management, Mimio, "Choosing and Installing a Whiteboard for a Touch Projector", www.mimio.boxlight.com, Jan. 15, 2020. 10 pages.

U.S. Appl. No. 13/958,427, filed Aug. 2, 2013, titled: "Capture of Vibro-Acoustic Data Used to Determine Touch Types."

U.S. Appl. No. 14/191,329, filed Feb. 26, 2014, titled: "Using Capacitive Images for Touch Type Classification."

U.S. Appl. No. 14/242,127, filed Apr. 1, 2014, titled: "Method and Apparatus for Classifying Touch Events on a Touch Sensitive Surface."

Vandoren, Peter, Van Laerhoven, Tom, Claesen, Luc, Taelman, Johannes, Di Fiore, Fabian, Van Reeth, Frank, Flerackers, Eddy; DIP-IT: Digital Infrared Painting on an Interactive Table; Proceedings of CHI, 2008; pp. 2901-2906; 2008.

Wang, Feng, Ren, Xiangshi; Empirical Evaluation for Finger Input Properties in Multi-Touch Interaction; Proceedings of CHI, 2009; pp. 1063-1072; 2009.

U.S. Appl. No. 14/492,604, filed Sep. 22, 2014, titled: "Method and Apparatus for Improving Accuracy of Touch Screen Event Analysis by Use of Edge Classification."

U.S. Appl. No. 14/483,150, filed Sep. 11, 2014, titled: "Method and Apparatus for Differentiating Touch Screen Users Based on Touch Event Analysis."

U.S. Appl. No. 14/495,041, filed Sep. 24, 2014, titled: "Method for Improving Accuracy of Touch Screen Event Analysis by Use of Spatiotemporal Touch Patterns."

Pedro, L et al., "Augmenting touch interaction through acoustic sensing", Proceedings of the ACM International 3onference on Interactive Tabletops and Surfaces, pp. 53-56, Nov. 13-16, 2011.

USING FINGER TOUCH TYPES TO INTERACT WITH ELECTRONIC DEVICES

CROSS-REFERENCE TO RELATED APPLICATIONS

This application is a continuation of and claims the benefit of priority under 35 U.S.C. § 120 of U.S. patent application Ser. No. 13/887,711, filed 6 May 2013, entitled, "USING FINGER TOUCH TYPES TO INTERACT WITH ELECTRONIC DEVICES", this application is incorporated herein by reference in its entirety for all purposes.

BACKGROUND OF THE INVENTION

1. Field of the Invention

This invention relates generally to interacting with electronic devices via a touch-sensitive surface.

2. Description of the Related Art

Many touch pads and touch screens today are able to support a small set of gestures. For example, one finger is typically used to manipulate a cursor or to scroll the display. Another example is using two fingers in a pinching manner to zoom in and out of content, such as a photograph or map. However, this is a gross simplification of what fingers and hands are capable of doing. Fingers are diverse appendages, both in their motor capabilities and their anatomical composition. Furthermore, fingers and hands can also be used to manipulate tools, in addition to making gestures themselves.

Thus, there is a need for better utilization of the capabilities of fingers and hands to control interactions with electronic devices.

SUMMARY OF THE INVENTION

The present invention allows users to interact with touch-sensitive surfaces in a manner that distinguishes different touch types. For example, the same touch interactions performed by a finger pad, a finger nail or a knuckle may result in the execution of different actions on the electronic device.

In one approach, a user uses his finger(s) to interact with an electronic device via a touch-sensitive surface, such as a touch pad or a touch screen. A finger touch interaction between the user and the touch-sensitive surface is detected. A finger touch type for the touch interaction is also determined. An action is taken on the electronic device in response to the finger touch interaction and finger touch type. That is, the same finger touch interaction can result in the execution of one action for one finger touch type and a different action for a different finger touch type.

In one aspect, finger touch types are classified at least in part based on which part of the finger makes contact, for example finger pad versus finger nail versus knuckle. In some cases, the finger pad is used as the primary touch type, while the finger nail and/or knuckle are used to implement secondary or auxiliary functions. The secondary or auxiliary functions may be less commonly used, or more complex, or require additional user input. In another aspect, the finger pad may be used to implement functions that are already familiar to users, while the finger nail and/or knuckle are used to implement new or unfamiliar functions. In yet another aspect, different finger touch types may correspond to different inputs types for other input devices. For example, one finger touch type might correspond roughly to right mouse clicks and another finger touch type to left mouse clicks.

Specific examples include activating a pop-up of a contextual menu based on finger touch type, distinguishing interactions requiring selection based on finger touch type, activating different drawing modes based on finger touch type, and taking different game actions based on finger touch type.

Other aspects of the invention include methods, devices, systems, components and applications related to the approaches described above.

BRIEF DESCRIPTION OF THE DRAWINGS

The invention has other advantages and features which will be more readily apparent from the following detailed description of the invention and the appended claims, when taken in conjunction with the accompanying drawings, in which:

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Figure 1:
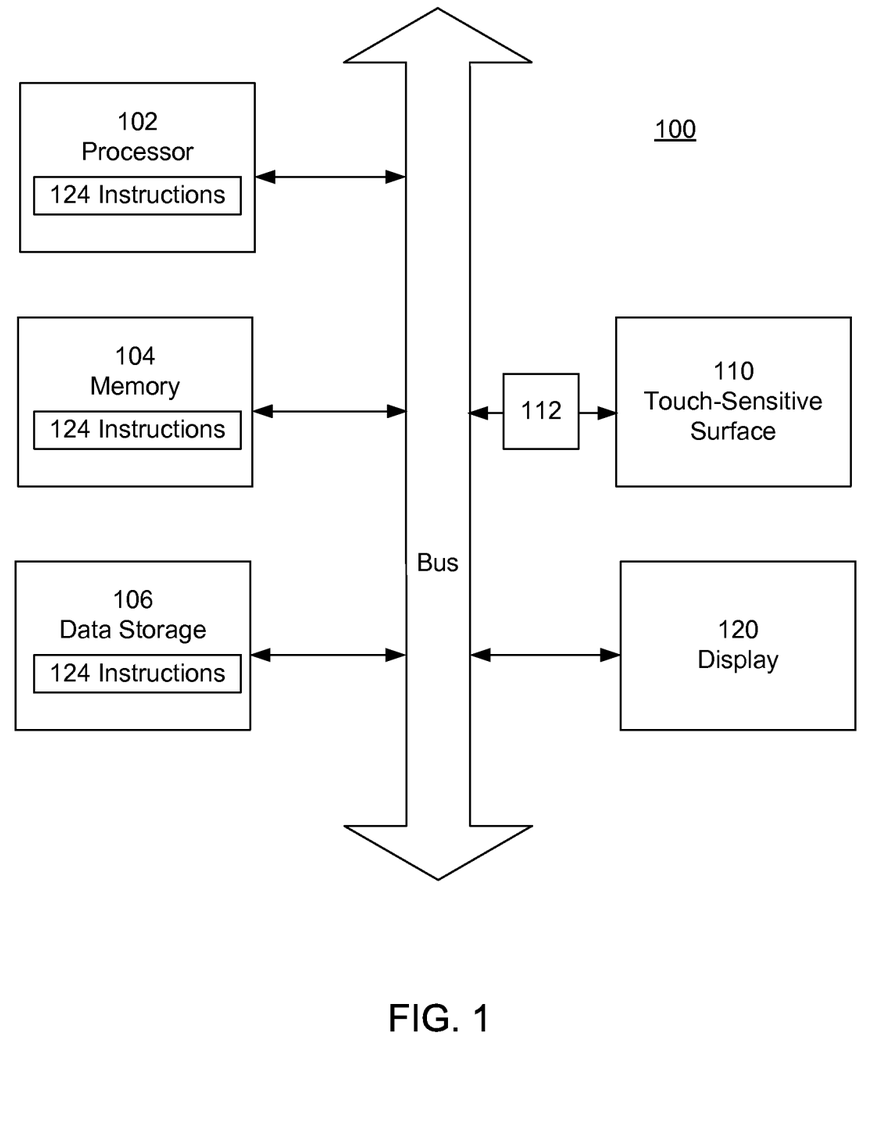
FIG. 1 is a block diagram of an electronic device according to the present invention.

FIG. 1 is a block diagram of an electronic device 100 according to the present invention. The device 100 includes a touch-sensitive surface 110, for example a touch pad or touch screen. It also includes computing resources, such as processor 102, memory 104 and data storage 106 (e.g., an optical drive, a magnetic media hard drive or a solid state drive). Detection circuitry 112 provides an interface between the touch-sensitive surface 110 and the rest of the device 100. Instructions 124 (e.g., software), when executed by the processor 102, cause the device to perform certain functions. In this example, instructions 124 include a touch analysis module that analyzes the user interactions with the touch-sensitive surface 110. The instructions 124 also allow the processor 102 to control a display 120 and to perform other actions on the electronic device.

In a common architecture, the data storage 106 includes a machine-readable medium which stores the main body of instructions 124 (e.g., software). The instructions 124 may also reside, completely or at least partially, within the memory 104 or within the processor 102 (e.g., within a processor's cache memory) during execution. The memory 104 and the processor 102 also constitute machine-readable media.

In this example, the different components communicate using a common bus, although other communication mechanisms could be used. As one example, the processor 102 could act as a hub with direct access or control over each of the other components.

The device 100 may be a server computer, a client computer, a personal computer (PC), or any device capable of executing instructions 124 (sequential or otherwise) that specify actions to be taken by that device. Further, while only a single device is illustrated, the term "device" shall also be taken to include any collection of devices that individually or jointly execute instructions 124 to perform any one or more of the methodologies discussed herein. The same is true for each of the individual components. For example, the processor 102 may be a multicore processor, or multiple processors working in a coordinated fashion. It may also be or include a central processing unit (CPU), a graphics processing unit (GPU), a network processing unit (NPU), a digital signal processor (DSP), one or more application specific integrated circuits (ASICs), or combinations of the foregoing. The memory 104 and data storage 106 may be dedicated to individual processors, shared by many processors, or a single processor may be served by many memories and data storage.

As one example, the device 100 could be a self-contained mobile device, such as a cell phone or tablet computer with a touch screen. In that case, the touch screen serves as both the touch-sensitive surface 110 and the display 120. As another example, the device 100 could be implemented in a distributed fashion over a network. The processor 102 could be part of a cloud-based offering (e.g., renting processor time from a cloud offering), the data storage 106 could be network attached storage or other distributed or shared data storage, and the memory 104 could similarly be distributed or shared. The touch-sensitive surface 110 and display 120 could be user I/O devices to allow the user to interact with the different networked components.

Figure 2:
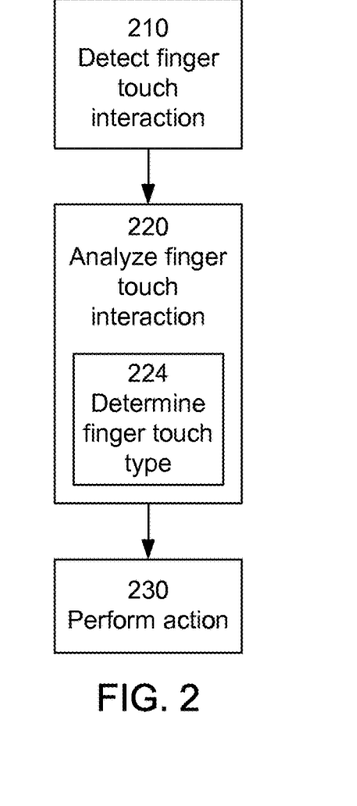
FIG. 2 is a flow diagram illustrating finger touch interaction using the device of FIG. 1.

FIG. 2 is a flow diagram illustrating touch interaction using device 100. The user uses his finger(s) to interact with the touch-sensitive surface 110. For example, he may use his finger to touch an element displayed on the device, or to touch-and-drag an element, or to touch-and-drag his finger over a certain region. These interactions are meant to instruct the electronic device to perform corresponding actions. The touch-sensitive surface 110 and detection circuitry 112 detect 210 this finger touch interaction. For example, the touch-sensitive surface may be based on capacitive, optical, resistive, electric field, acoustic or other technologies that form the underlying basis for the touch interaction. Whatever the underlying principle of operation, touches on the touch-sensitive surface will result in signals. However, these raw signals typically are not directly useable in a digital computing environment. For example, the signals may be analog in nature. The detection circuitry 112 typically provides an intermediate stage to process and/or condition these signals so that they are suitable for use in a digital computing environment.

A touch analysis module (implemented by instructions 124 in this example) analyzes 220 the detected finger touch interaction as an initial step to determine the appropriate actions to take. In this example, the analysis includes determining 224 the finger touch type, in addition to other analysis that may be performed.

Figure 3:
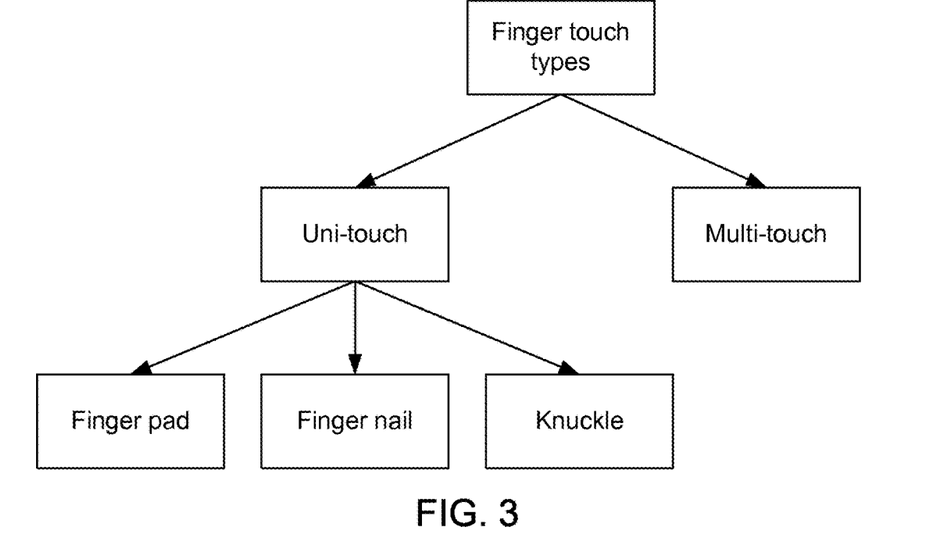
FIG. 3 illustrates a classification of different finger touch types.

FIG. 3 illustrates one possible classification of finger touch types. At a first level, finger touch types may be subdivided into "uni-touch" and "multi-touch." Uni-touch occurs when the touch interaction is defined by interaction with a single portion of a single finger, although the interaction could occur over time. Examples of uni-touch include a simple touch (e.g., a single tap), touch-and-drag, and double-touch (e.g., a double-tap—two taps in quick succession). In multi-touch, the touch interaction is defined by combinations of different fingers or finger parts. For example, a touch interaction where two fingers are simultaneously touching is a multi-touch. Another example would be when different parts of the same finger are used, either simultaneously or over time.

Finger touch types can also be classified according to which part of the finger touches. In FIG. 3, the uni-touch category is further subdivided according to the contacting finger part: finger pad, finger nail or knuckle. The finger pad is the fleshy part around the tip of the finger. It includes both the fleshy tip and the fleshy region from the tip to the first joint. The knuckle refers to any of the finger joints. The term "finger" is also meant to include the thumb. It should be understood that the finger itself is not required to be used for touching; similar touches may be produced in other ways. For example, the "finger pad" touch type is really a class of touch interactions that have similar characteristics as those produced by a finger pad touching the touch-sensitive surface, but the actual touching object may be a man-made instrument or a gloved hand or covered finger, so long as the touching characteristics are similar enough to a finger pad so as to fall within the class. The multi-touch category could also be subdivided in an analogous fashion.

Using the classification system of FIG. 3, a finger touch type of finger pad uni-touch means that the contacting part is the finger pad and the touch interaction is uni-touch rather than multi-touch. The categories shown in FIG. 3 are not exhaustive of all possible finger touch types. Nor is it the only possible classification.

In one approach, the finger touch type is determined in part by a classification of vibro-acoustic signals from the finger touch interaction. When an object strikes a certain material, vibro-acoustic waves propagate outward through the material or along the surface of the material. Typically, touch-sensitive surface 110 uses rigid materials, such as plastic or glass, which both quickly distribute and faithfully preserve the signal. As such, when respective finger parts touch or contact the surface of the touch-sensitive surface 110, vibro-acoustic responses are produced. The vibro-acoustic characteristics of the respective finger parts are unique, mirroring their unique anatomical compositions.

Figure 4:
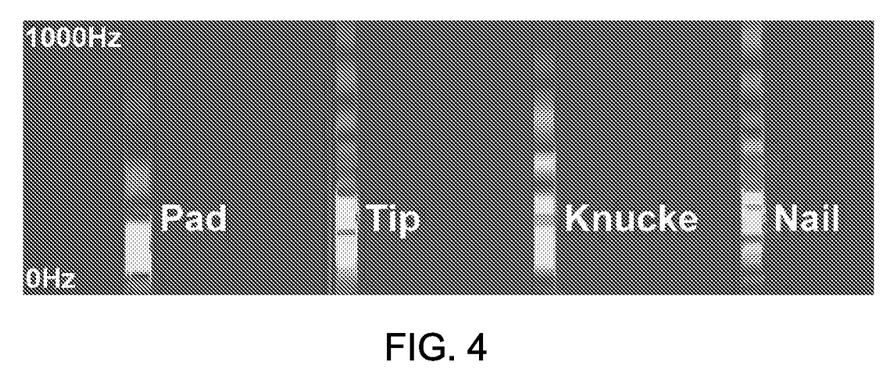
FIG. 4 is a spectrogram of three types of finger touches.

For example, FIG. 4 illustrates a spectrogram of three types of finger touches. As shown in FIG. 4, the finger pad, knuckle, and finger nail produce different vibro-acoustic responses.

Referring back to FIG. 1, the detection circuitry 112 may include circuitry and acoustic components to detect the vibro-acoustic signal. For example, these components may be arranged at a rear side of the touch-sensitive surface so that the vibro-acoustic signal caused by the touch interaction can be captured. The detection circuitry 112 can be triggered by the onset of the vibro-acoustic signal resulting from the touch interaction. To capture the vibro-acoustic signal, the detection circuitry 112 may include one or more impact sensors, vibration sensors, accelerometers, strain gauges, or acoustic sensors such as a condenser microphone, a piezo-electric microphone, MEMS microphone and the like. Once the vibro-acoustic signal has been captured, a vibro-acoustic classifier (mostly implemented as part of instructions 124 in FIG. 1) processes the vibro-acoustic signal to determine the finger touch type.

Figure 5:
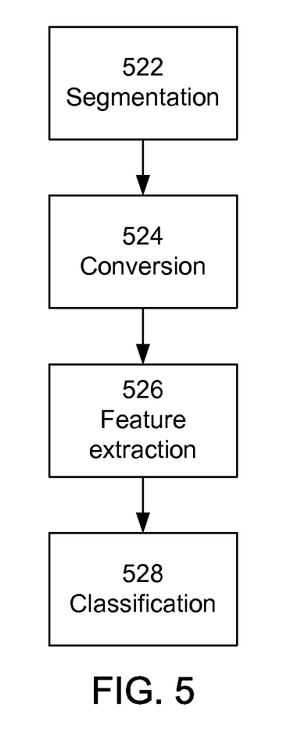
FIG. 5 is a block diagram of an example classifier.

FIG. 5 is a block diagram of an example classifier. It includes a segmentation module 522, a conversion module 524, a feature extraction module 526, and a classification module 528. This particular example is based on vibro-acoustics, although other phenomenon can also be used. The segmentation module 522 (implemented as part of detection circuitry 112 in FIG. 1) samples the vibro-acoustic signal in the background, for example, at a sampling rate of 96 kHz using a rolling buffer of 4096 samples of the vibro-acoustic signal. When a touch event occurs, the conversion module 524 performs a Fourier transform on the sampled time-dependent vibro-acoustic signal in the buffer to produce a frequency domain representation. For example, the Fourier transform of this window may produce 2048 bands of frequency power. The vibro-acoustic classifier 520 further takes in a series of features generated by the feature extraction module 526. These features include down-sampling the time and frequency domain data into additional vectors (e.g., buckets of ten), providing a different aliasing. In addition, additional time-domain features may be calculated from the vibro-acoustic signal, such as zero crossings, standard deviation of the absolute amplitude, and the center of mass for both the segmented input signal and the Fourier transformed signal. The classification module 528 classifies the vibro-acoustic signal using these features as well as other non-acoustic features, for example the major and minor axes of touch and capacitive response to determine the finger touch type (at least with respect to which part of the finger makes contact).

In one exemplary embodiment, the classification module 528 is implemented with a support vector machine (SVM) for feature classification. The SVM is a supervised learning model with associated learning algorithms that analyze data and recognize patterns, used for classification and regression analysis. To aid classification, the user can provide supplemental training samples to the vibro-acoustic classifier.

Returning to FIG. 2, the touch analysis module 124 analyzes 220 the finger touch interaction to determine the finger touch type. Based on this analysis, the processor 102 then takes the appropriate actions 230. The appropriate action depends on the finger touch interaction (e.g., touch, touch-and-drag, etc.) but it also depends on the finger touch type. The same finger touch interaction can result in different actions by processor 102, for different finger touch types. For example, a touch by the finger pad, a touch by the finger nail and a touch by the knuckle may trigger three different actions.

This approach allows the same touch interaction to control more than one action. This can be desirable for various reasons. First, it increases the number of available actions for a given set of touch interactions. For example, if finger touch types are not distinguished, then a single tap can be used for only one purpose, because a single tap by a finger pad, a single tap by a finger nail and a single tap by a knuckle cannot be distinguished. However, if all three of these finger touch types can be distinguished, then a single tap can be used for three different purposes, depending on the finger touch type.

Conversely, for a given number of actions, this approach can reduce the number of user inputs needed to reach that action. Continuing, the above example, if three actions are desired, by distinguishing finger touch types, the user will be able to initiate the action by a single motion—a single tap. If finger touch types are not distinguished, then more complex motions or a deeper decision tree may be required. For example, without different finger touch types, the user might be required to first make a single tap to bring up a menu of the three choices. He would then make a second touch to choose from the menu.

In one approach, the finger pad uni-touch type is used as the primary finger touch type. The other finger touch types, such as finger nail uni-touch, knuckle uni-touch, and multi-touch types, may be used as secondary touch types. Users may already be familiar with finger pad uni-touch motions, so these motions may remain the same, with other touch types used to implement additional functions. Alternately, the user may select which finger touch type is the primary type. For example, users with long finger nails may configure their devices so that finger nail uni-touch is their primary finger touch type.

In addition, users may also be familiar with other types of input devices. These other input devices may also have different inputs types, which can be mapped to different finger touch types. For example, the right click and left click functions on a computer mouse may be mapped to two different finger touch types, one corresponding to right click and the other to left click.

FIGS. 6-9 illustrate some examples. In these examples, the touch-sensitive surface is a touch screen.

Figure 6A:
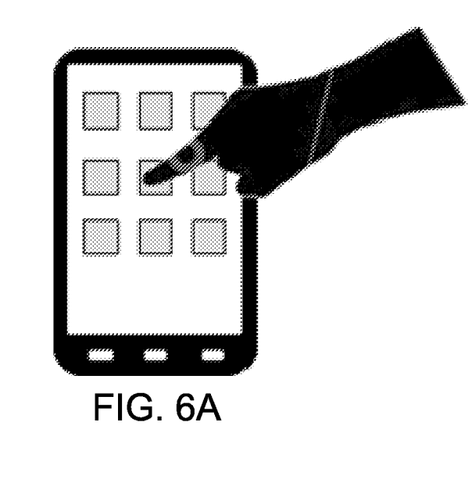
FIGS. 6A-6C illustrate examples where a finger touch type is used to activate a pop-up of a contextual menu.
Figure 6B:
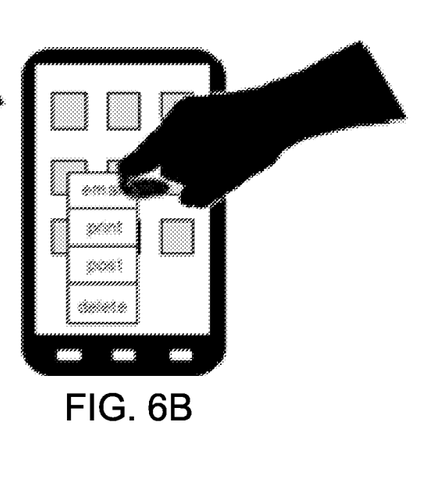
Figure 6C:
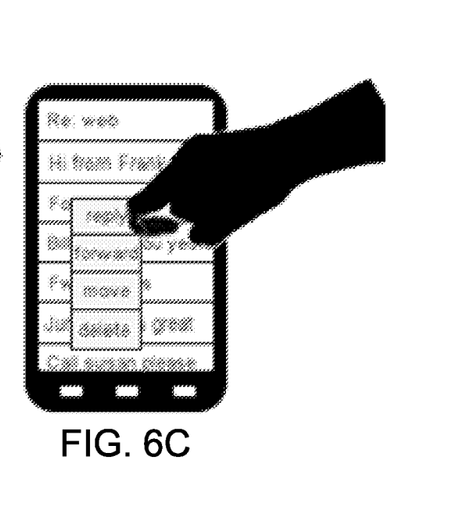

FIGS. 6A-6C illustrate examples where a finger pad touch type is used to activate one function, and a knuckle or finger nail touch type is used to activate a pop-up of a contextual menu. In FIG. 6A, a finger pad touches an element displayed on the electronic device. This activates a function associated with the element. For example, it might open the element (e.g., a photo, folder or file). It might select the element (e.g., a song or contact). It might launch an application associated with the element. If the element is a button control, it might activate the function associated with that button. If the element represents a phone number, it might dial the phone number. If the element is a web address, it might go to that web page.

However, in FIGS. 6B-6C, other finger touch types are used to pop-up a contextual menu. In FIG. 6B, the element represents a photo (or graphic). Touch by a knuckle pops-up the contextual menu with choices of: email, print, post, delete. Other implementations could offer other choices, e.g., modify, duplicate, resize, copy, cut, share, fast forward, rewind, pause, play, stop, exit, slow, resume, save, bookmark, open, duplicate, and/or post to web. In FIG. 6C, the element is an email. Touch by a knuckle opens a contextual menu with the following options: reply, forward, move, delete, and the like (e.g., reply all, print, print, archive, copy, cut, save).

Other examples of contextual menus will be apparent. For example, the element could represent a digital document and menu choices could include email, open, copy, cut, preview, move, print, share, email, modify, duplicate, post, remove, archive, trash, and/or delete. If the element were an application, the menu choices might include email, open, copy, cut, preview, move, print, share, email, modify, duplicate, post to web, and/or delete. If the element represents a link, the menu choices might include email, open, copy, cut, preview, open in new window, open in new tab, save, bookmark, print, and/or share.

Figure 7A:
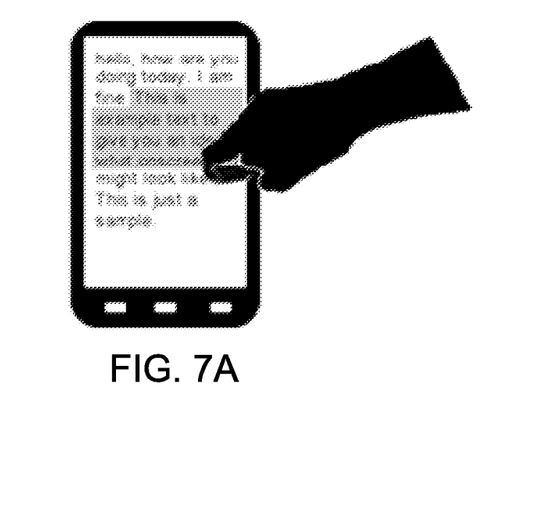
FIGS. 7A-7C illustrate examples where a finger touch type is used for interactions requiring selection.
Figure 7B:
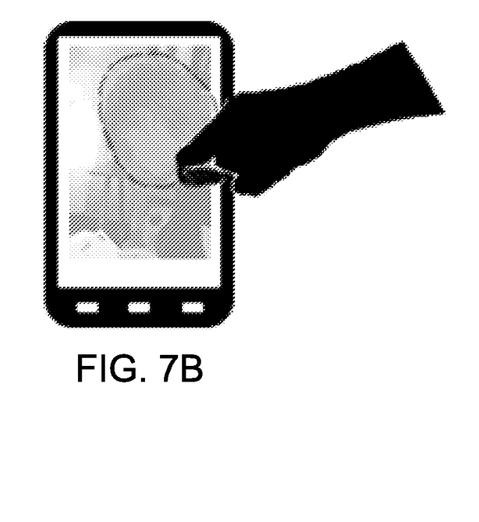
Figure 7C:
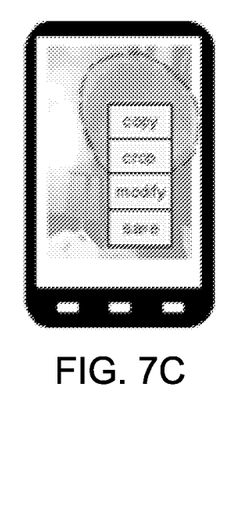

FIGS. 7A-7C illustrate examples where a finger pad touch type is used to activate one function and a knuckle or finger nail touch type can be used for interactions requiring selection. FIG. 7A concerns a selection of text. A finger pad may be used to scroll (i.e., translate a display window) through text. Using a knuckle or finger nail, a user may touch and drag over a region of text to select the text, as shown in FIG. 7A. In FIG. 7B, a knuckle or finger nail is used to touch-and-drag over a region of an image to lasso select an arbitrary shaped sub-region of the image; whereas the same motion by a finger pad would be used to move the image around on the display.

Alternately, a user may use a knuckle or finger nail to touch-and-drag over a region of an image to select a rectangular sub-region of the image. Upon completion of this selection action, a contextual menu could automatically appear. For example, as illustrated in FIG. 7C, following an image region selection, a contextual menu could appear with the following options: copy, crop, modify, save, etc. As another example, following a text selection (as in FIG. 7A), a contextual menu could appear with the following options: copy, cut, paste, search, delete, etc.

Figure 8A:
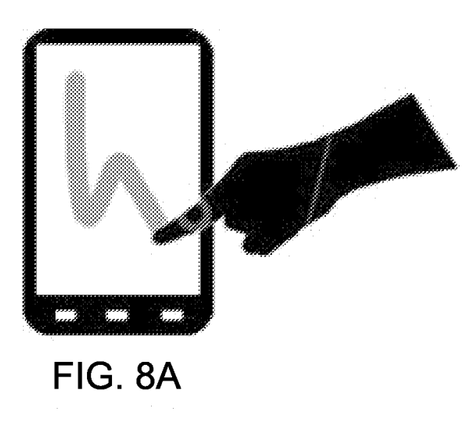
FIGS. 8A-8E illustrate examples where a finger touch type is used to select different drawing modes.
Figure 8B:
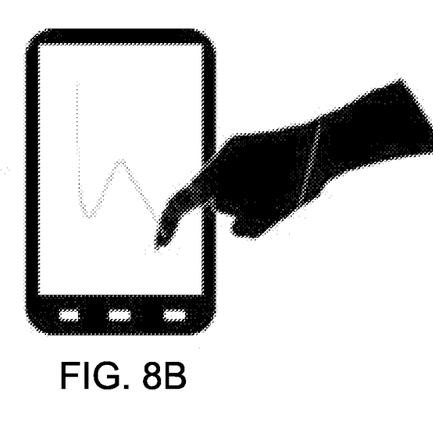
Figure 8C:
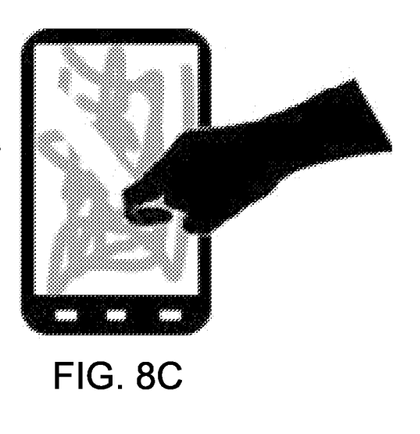
Figure 8D:
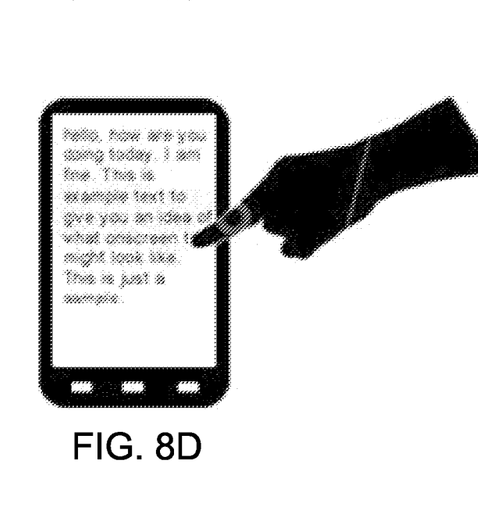
Figure 8E:
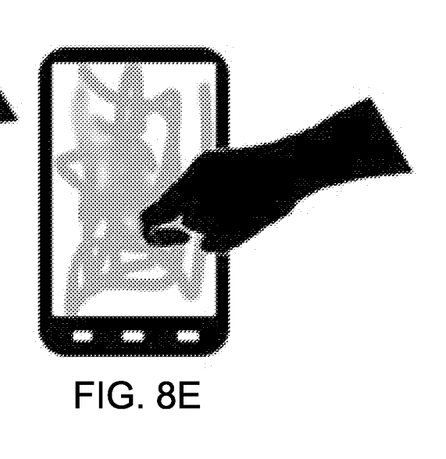

FIGS. 8A-8E illustrate examples where different finger touch types correspond to different drawing modes. In FIGS. 8A-C, the finger touch interaction is touch-and-dragging, which results in drawing a line on the touch screen. However, the finger pad is used as a thick brush, the finger nail as a fine marker, and the knuckle for erasing. In FIG. 8D-E, the finger pad is used as a marker for highlighting the selected text region while the knuckle is used for smudging.

Figure 9A:
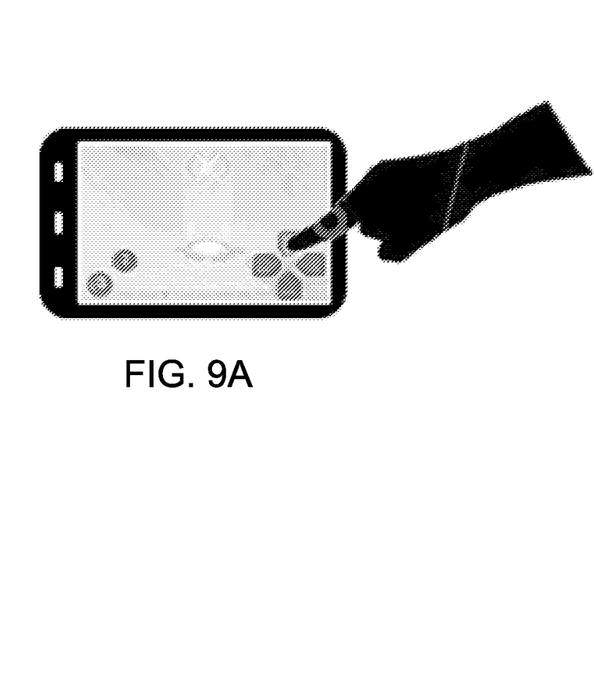
FIGS. 9A-9B illustrate examples where a finger touch type is used to select different actions that can be taken in a game.
Figure 9B:
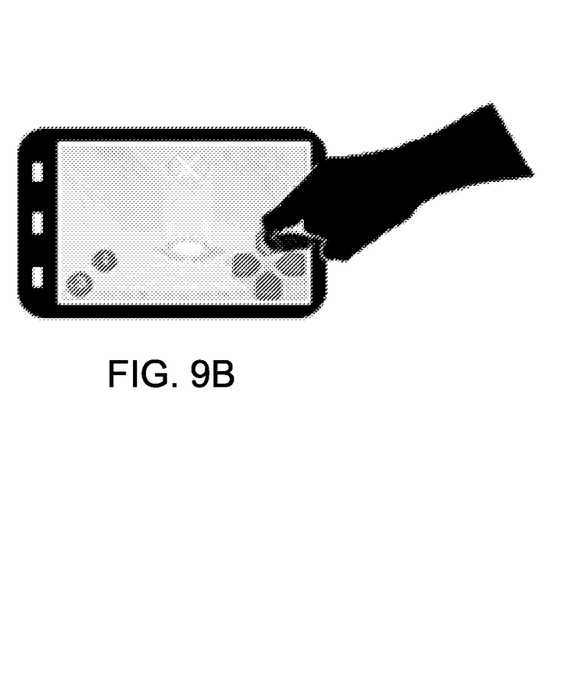

FIGS. 9A-9B illustrate examples where different finger touch types correspond to different actions that can be taken in a game. In FIG. 9A, using an onscreen movement control (e.g., virtual joy stick or arrow pad), a finger pad is used for regular in-game character (i.e., player) movement. If a knuckle or finger nail is used, as illustrated in FIG. 9B, the directional player movement may be performed in a crouched or other alternate position or movement speed. As another example, a finger pad may be used to fire a primary weapon and a knuckle or finger nail to fire an alternate weapon. As a final example, a touch with a finger nail may be used to run. In addition, a touch of the knuckle or finger nail (i.e., a tap) may be used to jump an in-game character.

Although the detailed description contains many specifics, these should not be construed as limiting the scope of the invention but merely as illustrating different examples and aspects of the invention. It should be appreciated that the scope of the invention includes other embodiments not discussed in detail above. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

The term "module" is not meant to be limited to a specific physical form. Depending on the specific application, modules can be implemented as hardware, firmware, software, and/or combinations of these. Furthermore, different modules can share common components or even be implemented by the same components. There may or may not be a clear boundary between different modules.

Depending on the form of the modules, the "coupling" between modules may also take different forms. Dedicated circuitry can be coupled to each other by hardwiring or by accessing a common register or memory location, for example. Software "coupling" can occur by any number of ways to pass information between software components (or between software and hardware, if that is the case). The term "coupling" is meant to include all of these and is not meant to be limited to a hardwired permanent connection between two components. In addition, there may be intervening elements. For example, when two elements are described as being coupled to each other, this does not imply that the elements are directly coupled to each other nor does it preclude the use of other elements between the two.

The invention claimed is:

1. A method of interaction between a user and an electronic device having a touch-sensitive surface, the method comprising:
   detecting a finger touch interaction between the user and the touch-sensitive surface based on a vibro-acoustic signal associated with the finger touch interaction;
   calculating time-domain features from the vibro-acoustic signal associated with the finger touch interaction;
   determining, based on analysis of the vibro-acoustic signal and the time-domain features, a finger touch type for the detected finger touch interaction using a support vector machine (SVM) and associated learning algorithms; and
   executing an action on the electronic device in response to the finger touch interaction and the finger touch type, wherein a corresponding finger touch interaction results in execution of a first action for a first finger touch type associated with a first portion of a finger of the user, and results in execution of a second action for a second finger touch type associated with a second portion of the finger of the user.

2. The method of claim 1, wherein the first finger touch type is a finger pad uni-touch.

3. The method of claim 2, wherein the second finger touch type is a knuckle uni-touch.

4. The method of claim 2, wherein at least one of the finger touch types is multitouch.

5. The method of claim 2, wherein the finger touch interaction is touching an element displayed on the electronic device, and touching the element results in the first action of opening the element when the first finger touch type is finger pad uni-touch.

6. The method of claim 2, wherein the finger touch interaction is touching an element displayed on the electronic device, and touching the element results in the first action of selecting the element when the first finger touch type is finger pad uni-touch.

7. The method of claim 2, wherein the finger touch interaction is touching an element representing an application, and touching the element results in the first action of launching the application when the first finger touch type is finger pad uni-touch.

8. The method of claim 2, wherein the finger touch interaction is touching a button control displayed on the electronic device, and touching the button control results in the first action of activating the button control when the first finger touch type is finger pad uni-touch.

9. The method of claim 2, wherein the finger touch interaction is touching an element displayed on the electronic device, and touching the element results in the first action of taking an action associated with the element when the first finger touch type is finger pad uni-touch.

10. The method of claim 2, wherein the finger touch interaction is touching an element representing a phone number, and touching the element results in the first action of dialing the phone number when the first finger touch type is finger pad uni-touch.

11. The method of claim 2, wherein the finger touch interaction is touching an element representing a web address, and touching the element results in the first action of going to the web address when the first finger touch type is finger pad uni-touch.

12. The method of claim 2, wherein the finger touch interaction is touch-and-dragging an element displayed on the electronic device, and touch-and-dragging the element results in the first action of moving the element on the display when the first finger touch type is finger pad uni-touch.

13. The method of claim 2, wherein the finger touch interaction is touch-and-dragging a slider control displayed on the electronic device, and touch-and-dragging the slider control results in the first action of operating the slider control when the first finger touch type is finger pad uni-touch.

14. The method of claim 2, wherein the second action is executed less frequently than the first action.

15. The method of claim 2, wherein the second action requires additional user input.

16. The method of claim 2, wherein the second action is more complex than the first action.

17. The method of claim 2, wherein the finger touch interaction is touching an element displayed on the electronic device, and touching the element results in the second action of displaying a contextual menu with choices of actions for the element.

18. The method of claim 17, wherein the element represents an email, and the menu choices include at least two from: reply, reply all, forward, print, archive, copy, cut, move, save, and delete.

19. The method of claim 17, wherein the element represents a photo or graphic, and the menu choices include at least two from: email, print, modify, crop, resize, copy, cut, share, move, email, open, duplicate, post to web, and delete.

20. The method of claim 17, wherein the element represents a video or animated content, and the menu choices include at least two from: email, modify, resize, copy, cut, share, fast forward, rewind, pause, play, stop, exit, slow, resume, save, bookmark, email, open, duplicate, post to web, and delete.

21. The method of claim 17, wherein the element represents a digital document, and the menu choices include at least two from: email, open, copy, cut, preview, move, print, share, modify, duplicate, post, remove, archive, trash, and delete.

22. The method of claim 17, wherein the element represents an application, and the menu choices include at least two from: email, open, copy, cut, preview, move, print, share, email, modify, duplicate, post to web, and delete.

23. The method of claim 17, wherein the element represents a link, and the menu choices include at least two from: email, open, copy, cut, preview, open in new window, open in new tab, save, bookmark, print, and share.

24. The method of claim 2, wherein the finger touch interaction is touch-and-dragging, and touch-and-dragging results in the second action of selecting elements displayed on the electronic device.

25. The method of claim 24 wherein touch-and-dragging results in the second action of selecting text displayed on the electronic device.

26. The method of claim 2, wherein the finger touch interaction is touch-and-dragging, and touch-and-dragging results in the second action of lassoing a sub-region of text displayed on the electronic device.

27. The method of claim 2, wherein the finger touch interaction is touch-and-dragging, and touch-and-dragging results in the second action of lassoing a sub-region of an image displayed on the electronic device.

28. The method of claim 2, wherein the finger touch interaction is touch-and-dragging, and touch-and-dragging results in the first action of drawing in a first drawing mode for the first finger touch type and results in the second action of drawing in a second drawing mode for the second finger touch type.

29. The method of claim 2, wherein the finger touch interaction is touch-and-dragging, and touch-and-dragging results in the first action of drawing for the first finger touch type and results in the second action of erasing for the second finger touch type.

30. The method of claim 2, wherein the first action is an action taken in a game played on the electronic device and the second action is a different action taken in the game, wherein the user has a choice of which action to take.

31. The method of claim 30, wherein the finger touch interaction results in the first action of firing a first weapon in the game for the first finger touch type and results in the second action of firing a second weapon in the game for the second finger touch type.

32. The method of claim 30, wherein the finger touch interaction results in the first action of making a first type of character movement in the game for the first finger touch type and results in the second action of making a second type of character movement in the game for the second finger touch type.

33. The method of claim 1, wherein the user can interact with the electronic device using another input device, the input device having a first input type and a second input type, actions resulting from the first input type correspond to actions for the first finger touch type, and actions resulting from the second input type correspond to actions for the second finger touch type.

34. The method of claim 33, wherein the user can interact with the electronic device using a mouse, wherein first mouse click actions correspond to actions for the first finger touch type, and wherein second mouse click actions correspond to actions for the second finger touch type.

35. The method of claim 1, wherein the touch-sensitive surface is a touch screen.

36. A non-transitory machine-readable tangible storage medium having stored thereon data representing sequences of instructions, which when executed by an electronic device having a touch-sensitive surface, cause the electronic device to perform a method comprising the steps of:
    detecting a finger touch interaction between a user and the touch-sensitive surface based on a vibro-acoustic signal associated with the finger touch interaction;
    calculating time-domain features from the vibro-acoustic signal associated with the finger touch interaction;
    determining, based on analysis of the vibro-acoustic signal and the time-domain features, a finger touch type for the detected finger touch interaction using a support vector machine (SVM) and associated learning algorithms; and
    executing an action on the electronic device in response to the finger touch interaction and the finger touch type, wherein a corresponding finger touch interaction results in execution of a first action for a first finger touch type associated with a first portion of a finger of the user, and results in execution of a second action for a second finger touch type associated with a second portion of the finger of the user.

37. An electronic device comprising:
- a touch-sensitive surface;
- detection circuitry coupled to the touch-sensitive surface, for detecting a finger touch interaction with the touch-sensitive surface based on a vibro-acoustic signal associated with the finger touch interaction;
- a feature extraction module coupled to the detection circuitry, for calculating time-domain features from the vibro-acoustic signal associated with the finger touch interaction;
- a touch analysis module coupled to the detection circuitry, for determining, based on analysis of the vibro-acoustic signal and the time-domain features, a finger touch type for the detected finger touch interaction using a support vector machine (SVM) and associated learning algorithms; and
- a processor coupled to the touch analysis module, the processor for executing an action on the electronic device in response to the finger touch interaction and the finger touch type, wherein a corresponding same finger touch interaction results in execution of a first action for a first finger touch type associated with a first portion of a finger of a user, and results in execution of a second action for a second finger touch type associated with a second portion of the finger of the user, wherein the first action is a primary action.

* * * * *